US009106510B2

(12) United States Patent
Filsfils

(10) Patent No.: US 9,106,510 B2
(45) Date of Patent: Aug. 11, 2015

(54) DISTRIBUTED DEMAND MATRIX COMPUTATIONS

(71) Applicant: CISCO TECHNOLOGY, INC., San Jose, CA (US)

(72) Inventor: Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 132 days.

(21) Appl. No.: 13/752,926

(22) Filed: Jan. 29, 2013

(65) Prior Publication Data

US 2013/0265905 A1 Oct. 10, 2013

Related U.S. Application Data

(60) Provisional application No. 61/621,811, filed on Apr. 9, 2012.

(51) Int. Cl.
*H04L 12/26* (2006.01)
*H04L 12/721* (2013.01)
*H04L 12/24* (2006.01)

(52) U.S. Cl.
CPC ............... *H04L 43/00* (2013.01); *H04L 41/00* (2013.01); *H04L 43/04* (2013.01); *H04L 43/08* (2013.01); *H04L 43/0805* (2013.01); *H04L 45/70* (2013.01); *H04L 41/0681* (2013.01)

(58) Field of Classification Search
CPC ......... H04L 43/00; H04L 41/00; H04L 43/08; H04L 45/70; H04L 43/04; H04L 43/0805
USPC .......................................... 370/253, 235, 238
See application file for complete search history.

(56) References Cited

U.S. PATENT DOCUMENTS

| 7,002,960 | B1 | 2/2006 | Golan et al. | |
| 7,027,396 | B1* | 4/2006 | Golan et al. | 370/232 |
| 7,743,139 | B1 | 6/2010 | Golan et al. | |
| 7,817,549 | B1* | 10/2010 | Kasralikar et al. | 370/232 |
| 7,898,973 | B2 | 3/2011 | Filsfils et al. | |
| 7,904,586 | B1* | 3/2011 | Griffin et al. | 709/238 |
| 2008/0298265 | A1 | 12/2008 | Filsfils et al. | |

FOREIGN PATENT DOCUMENTS

WO WO/2006/130830 8/2007

OTHER PUBLICATIONS

IETF RFC 6413, Poretsky Allot, et al., "Benchmarking Methodolofy for Link-State IGP Data-Plane Route Covnergence", Nov. 22, 2011.

(Continued)

*Primary Examiner* — Mohammad Anwar
(74) *Attorney, Agent, or Firm* — Cindy Kaplan

(57) ABSTRACT

In one embodiment, a method includes receiving a packet at a first network device, logging the packet into a demand corresponding to a cell of a demand matrix, and storing the demand in a demand database at the first network device. The demand database includes a plurality of demands computed for a specified time period and corresponding to cells of the demand matrix associated with traffic entering a network at the first network device. Demands corresponding to cells of the demand matrix associated with traffic entering the network at a second network device are computed and stored at the second network device. An apparatus and logic are also disclosed herein.

20 Claims, 3 Drawing Sheets

(56) References Cited

OTHER PUBLICATIONS

H. Gredler et al., "Advertising Link-State Information in BGP", Jul. 11, 2011.

IETF Internet Draft "Advertising Link-State Information in BGP" draft-gredler-bgp-te-01, H. Gredler, Jul. 11, 2011.

IETF RFC 3107, "Carrying Label Information in BGP-4", Y. Rekhter et al., May 2001.

* cited by examiner

DISTRIBUTED DEMAND MATRIX COMPUTATIONS

STATEMENT OF RELATED APPLICATION

The present application claims priority from U.S. Provisional Application No. 61/621,811, entitled NETWORK AVAILABILITY ANALYTICS, filed on Apr. 9, 2012. The contents of this provisional application are incorporated herein by reference in its entirety.

TECHNICAL FIELD

The present disclosure relates generally to communication networks, and more particularly, to computing traffic demand matrices.

BACKGROUND

A traffic matrix (also referred to as a demand matrix or traffic demand matrix) describes traffic flows that enter, traverse, and leave a network. Each demand is a single traffic matrix entry that identifies the amount of traffic that enters the network at one point and leaves the network at another point. While traffic matrices are essential to network operators, they often have accuracy issues.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
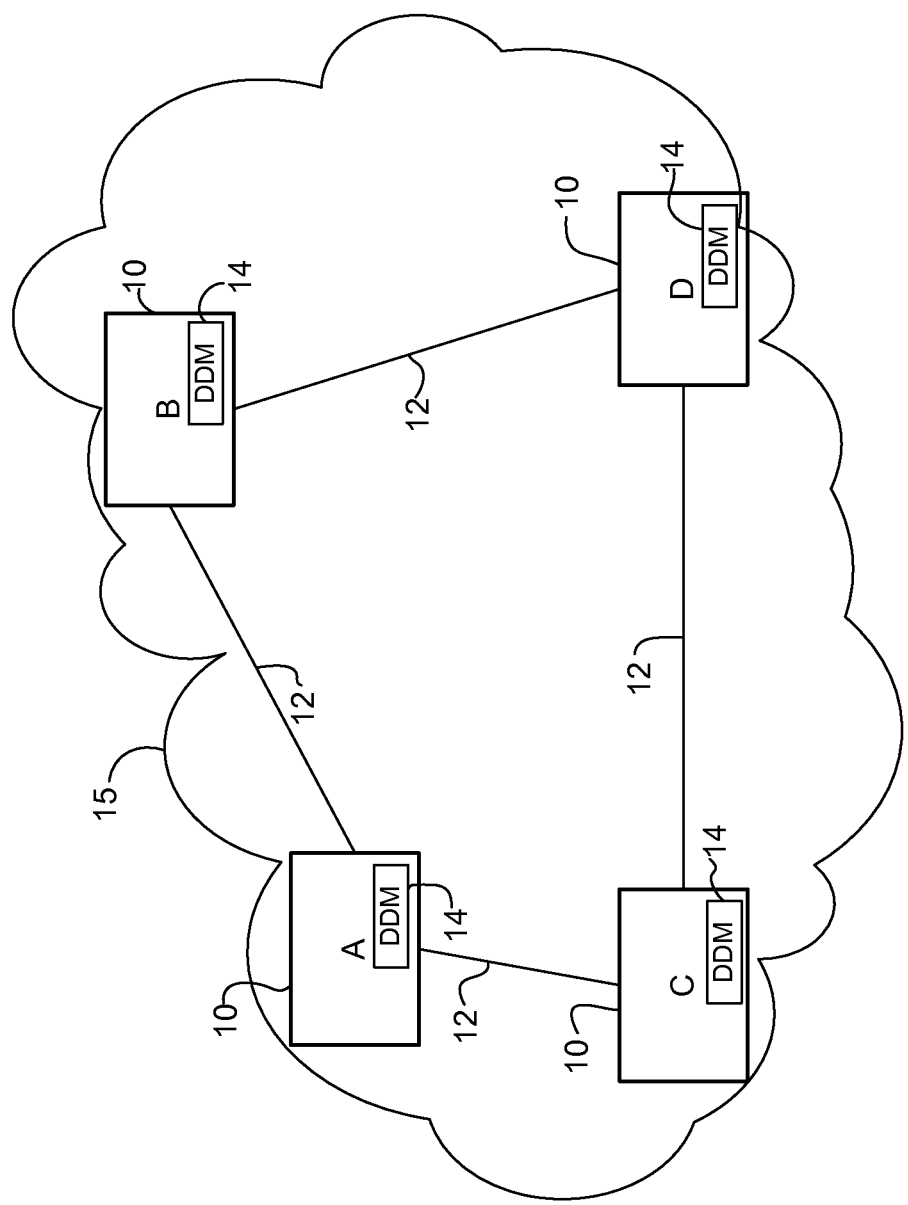
FIG. 1 illustrates an example of a network in which embodiments described herein may be implemented.

In one embodiment, a method generally comprises receiving a packet at a first network device, logging the packet into a demand corresponding to a cell of a demand matrix, and storing the demand in a demand database at the first network device. The demand database includes a plurality of demands computed for a specified time period and corresponding to cells of the demand matrix associated with traffic entering a network at the first network device. Demands corresponding to cells of the demand matrix associated with traffic entering the network at a second network device are computed and stored at the second network device.

In another embodiment, an apparatus generally comprises a processor for logging a received packet into a demand corresponding to a cell of a demand matrix and storing the demand in a demand database. The demand database comprises a plurality of demands computed for a specified time period and corresponding to cells of the demand matrix associated with traffic entering a network at the apparatus. The apparatus further includes memory for storing the demand database. Demands corresponding to cells of the demand matrix associated with traffic entering the network at a network device are computed and stored at the network device.

In yet another embodiment, logic is encoded on one or more tangible computer readable media for execution and when executed operable to log a packet received at a network device into a demand corresponding to a cell of a demand matrix, store the demand in a demand database comprising a plurality of demands corresponding to cells of the demand matrix associated with traffic entering a network at the network device, receive demands corresponding to cells of the demand matrix associated with traffic entering the network at other network devices, and generate the demand matrix.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

A demand is generally defined as all packets exiting the network at a specific edge node. In a network of N edge nodes, a demand matrix is made of $N^2$ cells such as [X, Y], which denotes the number of packets and bytes that ingressed the network at X and egressed from the network at Y. A demand can be further defined in terms of the origin AS (Autonomous System), neighbor ingress AS, neighbor egress AS, destination AS, incoming interface at the collecting router, DSCP (Differentiated Services Code Point) class, and the like.

A drawback with conventional techniques used to generate traffic matrices is the poor scaling of centralized solutions based around network traffic flow collectors, in which routers collect flow information and export raw or aggregated data. Network traffic flow collection software for traffic monitoring (e.g., NetFlow) or hardware traffic probes can be installed around the perimeter of a network to provide detailed traffic matrix information. However, an approach based purely on NetFlow or hardware probing is not appropriate for all network operators. In addition to processing all of the NetFlow records from their router clients, collectors also need to maintain the specific BGP (Border Gateway Protocol) tables of each individual router client.

Conventional systems either require a full-mesh of TE (Traffic Engineering) tunnels from PE (provider edge) to PE, which does not scale well and incurs high costs, or a centralized network traffic flow analyzer to continuously maintain the individual BGP table of each PE node. Another problem is the difficulty in correlating asynchronous flow export measurements with a network wide synchronized demand matrix. Combining data into a single demand matrix can be challenging because the data collected may not cover the same time period. The difficulty in gathering accurate, consistent, timely, and complete measurement data often results in erroneous demand matrices.

The embodiments described herein can be used to generate accurate demand matrices without the need for centralized computation. The embodiments provide a scalable, lightweight, always-on, accurate solution to derive demand matrices. As described in detail below, each participating distributed demand matrix (DDM) router uses an accounting technique to derive local elements of the demand matrix. Edge routers compute their share of the demand matrix so that the computation effort is distributed to each router. The distributed workload provides scalability benefits. Accuracy is provided by precise accounting. Furthermore, there is no need to simulate the BGP view of each individual router on a centralized collector, which is error prone. Timing rules ensure that all cells of a given demand matrix relate to the same time period. In one embodiment, a pull model is used for classic applications requiring a demand matrix. In another embodiment, the DDM routers advertise their local elements of the demand matrix so that all of the routers have the complete demand matrix. By providing routers with information on topology and global traffic rather than topology and local traffic, new possibilities open up in the space of traffic engineering, resiliency, and agile IP/optical topologies.

Referring now to the drawings, and first to FIG. 1, an example of a network 15 in which embodiments described herein may be implemented is shown. For simplification, only a small number of nodes are shown. The embodiments operate in the context of a data communication network including multiple network devices. The network may include any number of network devices in communication via any number of nodes (e.g., routers, switches, or other network devices), which facilitate passage of data within the network.

The network 15 shown in the example of FIG. 1 includes four network devices 10 (A, B, C, D) connected by links 12 and located along an edge of the network. The network devices 10 may be routers or other network devices configured to perform routing functions. The routers 10 may be located, for example, along an edge of a service provider network, or any other network. Each edge device 10 may be in communication with one or more Autonomous System (AS), customer network, data center, or any other network or network device. The routers 10 are part of a perimeter around the network 15, which includes all of the provider edge routers, aggregation routers, broadband routers, or other routers forming a continuous perimeter around the network.

A demand represents traffic flowing between any two edge devices 10 in the network 15. There may be any number of traffic flows across the network. A demand matrix (traffic matrix, traffic demand matrix) describes the aggregation of flows at the edge of the network. A demand is a single element (cell) of the demand matrix associated with a source and destination in the network. Each demand is thus a single entry in the demand matrix that identifies the amount of traffic that enters the network at one point and leaves the network at another point. For example, traffic may enter the network 15 at router A and traverse the network along a path until it reaches router C, where it leaves the network. In order to construct the demand matrix, information is collected about all of the traffic and how it enters and exits the network. Traffic measurements are mapped to individual demands.

A demand matrix for the routers shown in FIG. 1 may be expressed as follows:

$$\begin{bmatrix} AA & AB & AC & AD \\ BA & BB & BC & BD \\ CA & CB & CC & CD \\ DA & DB & DC & DD \end{bmatrix}$$

Each row of the above demand matrix includes cells corresponding to traffic received at one of the edge devices 10. For example, the first row comprises cells corresponding to traffic received at router A that will egress the network at router A (AA), router B (AB), router C (AC), and router D (AD). Similarly, the second row comprises cells corresponding to traffic received at router B that will egress the network at router A (BA), router B (BB), router C (BC), and router D (BD), and the third and fourth rows comprise the cells corresponding to traffic entering the network at routers C and D, respectively. Each router 10 computes its own row (local demands) for the demand matrix. The local demands from each of the routers 10 can be collected at one or more of the routers, or another device in the network and the complete demand matrix generated, as described below.

Each DDM router 10 includes a DDM module 14 configured to compute all of the [X, Y] cells of the demand matrix, where X is the router at which the DDM module is located. Each DDM module 14 is also configured for synchronized periodic measurement archive. This allows the distributed measurements from different routers 10 to be combined. Each router 10 further includes a demand database maintained by the DDM module 14. DDM measurements from each linecard are stored in the database for a specified time period. The demands in the database may be retrieved for use by capacity planning applications or other operational applications running on a centralized server, for example. Demands from the database may also be advertised to other routers 10 participating in the DDM process.

It is to be understood that the network shown in FIG. 1 and described above is only an example and that the embodiments described herein may be implemented in networks having any number or type of network devices or topology. For example, there may be any number of intermediate or core nodes located within the network, between the edge devices 10. Also, each edge device 10 may be in communication with any number of other networks or network devices in one or more Autonomous System (AS), for example.

Figure 2:
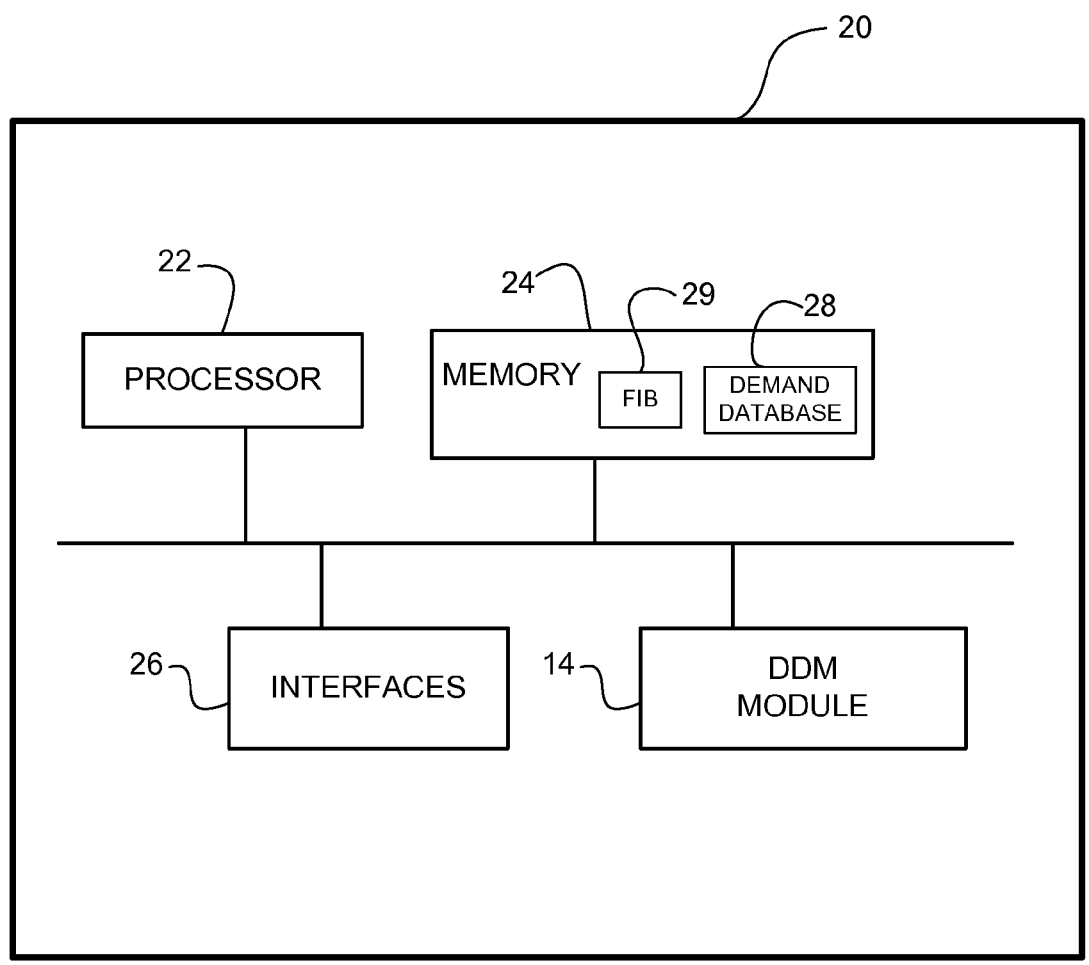
FIG. 2 depicts an example of a network device useful in implementing embodiments described herein.

FIG. 2 illustrates an example of a network device 20 (e.g., router) that may be used to implement embodiments described herein. In one embodiment, the network device 20 is a programmable machine that may be implemented in hardware, software, or any combination thereof. The network device 20 includes one or more processor 22, memory 24, network interfaces 26, and DDM module 14.

Memory 24 may be a volatile memory or non-volatile storage, which stores various applications, operating systems, modules, and data for execution and use by the processor 22. For example, memory 24 may include one or more of the DDM components implemented in software, demand database 28 for storing demand measurements or cells of a demand matrix, and FIB (Forwarding Information Base) 29. The DDM module 14 may comprise software or code stored in memory 24.

Logic may be encoded in one or more tangible media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The network interfaces 26 may comprise any number of interfaces (linecards, ports) for receiving data or transmitting data to other devices. The network interfaces 26 may include, for example, an Ethernet interface for connection to a computer or network.

It is to be understood that the network device 20 shown in FIG. 2 and described above is only an example and that different configurations of network devices may be used. For example, the network device 20 may further include any suitable combination of hardware, software, algorithms, processors, devices, components, or elements operable to facilitate the capabilities described herein.

Figure 3:
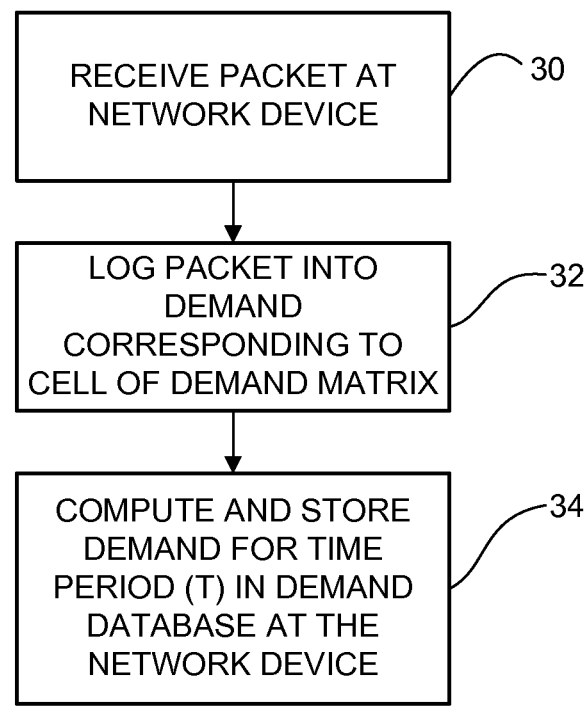
FIG. 3 is a flowchart illustrating an overview of a process for use in computing a distributed demand matrix, in accordance with one embodiment.

FIG. 3 is a flowchart illustrating an overview of a process for use in computing a distributed demand matrix, in accordance with one embodiment. At step 30, a first network device (e.g., router 10 in FIG. 1) receives a packet. The router 10 logs the packet into a demand corresponding to a cell of a demand matrix (step 32). For example, router A in FIG. 1 may receive a packet that will egress the network at router B. This packet (packet count, byte count) is logged into a demand corresponding to cell AB of the demand matrix. The demand is computed and stored in demand database 28 for a specified time period (step 34). Demands corresponding to cells of the demand matrix associated with traffic entering the network at other network devices are computed and stored at the respective network devices. Demands from the database 28 may be retrieved for computation of the demand matrix at a management station, centralized server, or other network device. Each router 10 may also advertise demands from its database to other routers, so that each router can generate the complete demand matrix.

The database 28 at a first network device (e.g., router A in FIG. 1) comprises a plurality of demands computed and stored for a first time period (T1) and corresponding to cells of the demand matrix associated with traffic entering the network at the first network device. For example, the demand database 28 for router A includes demands (traffic measurements) for cells AA, AB, AC, and AD of the demand matrix. The demands for each of these cells are computed and stored periodically at time period T1. Demands corresponding to cells of the demand matrix associated with traffic entering the network at a second network device (e.g., router B in FIG. 1) are computed and stored at the second network device at a second time period (T2). For example, demands corresponding to cells BA, BB, BC, and BD are stored at router B periodically at time period T2.

One of the first and second time periods is preferably a multiple of the other time period. For example, T1 may be equal to 1×T2, 2×T2, 3×T2 . . . etc. Demands are also computed and stored at routers C and D in FIG. 1 at specified time periods. All of the time periods used at each edge device 10 have a common multiple. This timing rule makes it possible to combine the distributed measurements of different routers, as described further below.

As discussed above, the DDM process includes accounting, synchronized periodic measurement archive, DDM database maintenance, and collection of DDM measurements. Each of these functions is described in detail below.

Accounting is distributed to each linecard of each router 10. Upon receiving a packet, the linecard logs it into a demand either on the basis of a demand marker inserted in an FIB (Forwarding Information Base) structure on a per-prefix basis, which allows for accurate accounting and does not require any extra function other than a conventional FIB lookup, or on the basis of NetFlow aggregation policies, which then require NetFlow processing and potentially sampling for performance reasons.

The demand marker inserted in the FIB is preferably computed automatically by the router 10. One embodiment operates to allocate one demand marker per IGP node router-ID. This tracks the number of packets and bytes egressing the network at each of the remote locations. A preferred embodiment involves allocating a marker per tuple such as ingress interface at the counting router, neighboring ingress AS, DSCP class, egress IGP node, and neighboring AS at the egress router. A further refinement includes allocating multiple demand markers per FIB entry. For example, a second marker may be used to track the final destination AS. This scales better, since it does not require further increasing the number of entries in the tuple defining the first marker. The embodiments may be implemented in the BGP routing process, wherein it binds each BGP route to a demand marker. The resulting markers are then inserted in the FIB updates together with their related routes. This can be viewed as an extension of a BGP Policy Accounting (BPA) process, with a much higher number of markers, an automated generation of markers, and the ability to have multiple markers per BGP route.

In one embodiment, each participating router 10 runs a DDM process on a route processor that leverages an NTP (Network Time Protocol) synchronized clock. Each router may be configured to archive measurements every time period T referenced to the top of the hour. T may be, for example, 1, 2, 3, 5, 6, 10, 12, 20, 30, or 60 minutes. In one example, if a router is configured with T=15 minutes, it will archive the DDM cell measurements for each of its linecards at 12 h00, 12 h15, 12 h30, 12 h45, 13 h00, 13 h15, . . . etc. This simplifies the combining of distributed measurements of different routers.

In one example, all four routers 10 in FIG. 1 run DDM with T=15 minutes. In this case, the cells collected at 12 h15 by router A can easily be combined with the cells of routers B, C, and D collected at the same time to derive a clear demand matrix where all of the cells relate to the time period 12 h00-12 h15.

This scheme also allows for routers 10 to store demand measurements at different time periods (e.g., to accommodate different CPU performance or software release) and still eases the recombination into a global demand matrix that relates to a well-defined and common time period. For example, router A may be running with a time period of T=5 minutes while the other routers run at T=15 minutes. A demand matrix can still be derived every 15 minutes where all the cells relate to the same 15 minute time period. For example, the AC cell for 12 h00-12 h15 is the sum of the AC cells for 12 h00-12 h05, 12 h05-12 h10, and 12 h10-12 h15.

In one embodiment, T is restricted to 1, 2, 3, 5, 6, 10, 12, 20, 30, or 60 minutes to ensure that at least a network wide demand matrix can be derived every 60 minutes. Other sets of various time periods may also be used, following the same multiplicity principle.

Each router 10 configured for DDM runs a DDM process that maintains DDM database 28. In one embodiment, the database 28 is indexed according to time with one entry every time period T. At the end of every time period, the DDM process collects the DDM measurements from each linecard at the router 10 and stores the values in the database entry for that time period.

For example, if router A is running at T=15 minutes, at 12 h30, router A's DDM process collects the local DDM measurements [AA, AB, AC, AD] and inserts the measurements in the local DDM database under the time entry 12 h15-12 h30. This scales very well, even at the scale of a very large service provider. For example, 5000 pairs of counters (byte count, packet count) every 15 minutes, results in 3.8 Mbyte per day.

The timing rules described above ensure that it is straightforward to recompose the different cells into matrices that relate to a specific time period. While a router can operate at a fine periodicity (T=15 minutes) for the purpose of maintaining its local DDM database, it can send its BGP DDM updates at a lower frequency (e.g., every 60 minutes). The multiple timing assumption described above is leveraged.

In one example, the embodiments described herein are used with an application such as capacity planning or operational reporting. The application may run on a centralized server and therefore need to retrieve the DDM measurements via a pull model. In one embodiment, a YANG data model is used and NETCONF access is leveraged. YANG is a data modeling language used to model configuration and state data manipulated by Network Configuration Protocol (NETCONF), NETCONF remote procedure calls, and NETCONF notifications. XML (Extensible Markup Language) and XMPP (Extensible Messaging and Presence Protocol) may also be used.

Another use for the DDM embodiments is to let each router 10 participating in DDM learn the measurements of the other routers. This provides resiliency, agile topology, and traffic engineering. With regard to resiliency, in conventional networks, the need to protect a link and the selection of backup path is done without any consideration for the real traffic going through the link. If a router has the demand matrix, the router can compute which demands flow through its links and which need to be protected, and therefore select different protection techniques accordingly. For example, a partial LFA (Loop Free Alternate) coverage may be found if there is an LFA for 99.99% of the traffic but only LFA for 82% of the routes. With the distributed demand matrix, the routers 10 can compute resiliency based on real traffic impacted or protected, rather than just route/topology.

By leveraging IP/optical integration, routers have the ability to automate the addition of waves such as to provide a much more agile IP topology (responding to demand matrix changes). The decision logic is incomplete as long as the routers do not have a view of the demand matrix. The embodiments provide DDM information for use with tools such as GMPLS (Generalized Multi-Protocol Label Switching) UNI (User Network Interface) integration and DWDM (Dense Wavelength Division Multiplexing) agility.

In another example, the availability of the demand matrix at a head-end network device offers tools to improve the efficiency of the head-end based computation as it can take into consideration the need of other head-ends.

In one embodiment, a BGP-LS extension is used to disseminate the cells measured by each DDM router. Each router advertises these demands through an extension, for example, of IETF draft-gredler-bgp-te-01 ("Advertising Link-Sate Information in BGP", H. Gredler et al., Jul. 11, 2011) so that all routers are aware of all the demands in the network. For example, router A is able to locally compute local demands ([A, A], [A, B], [A, C], and [A, D]) using the accounting scheme described above. Router A advertises these four cells via BGP updates, using this new extension. Routers B, C and D also advertise their DDM information. Thus, all four of the routers (A, B, C, D) learn the sixteen cells of the demand matrix (four locally and twelve via BGP advertisements). Third party applications can listen to these BGP updates and learn dynamically the demand matrix and its evolution throughout the day. The BGP distribution extension acts as an API (Application Programming Interface) into the distributed demand matrix computation mechanism.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   receiving a packet at a first router;
   logging the packet into a demand corresponding to a cell of a demand matrix;
   storing said demand in a demand database at the first router, the demand database comprising a plurality of demands computed for a specified time period and corresponding to cells of said demand matrix, each of said cells identifying traffic entering a network at the first router and leaving the network at another router;
   receiving from other routers in the network, demands corresponding to cells of said demand matrix associated with traffic entering the network at the other routers and computed and stored at the other routers; and
   generating the demand matrix at the first router.

2. The method of claim 1 wherein logging the packet into said demand comprises inserting a demand marker in a forwarding information base.

3. The method of claim 2 wherein the demand marker is allocated for an Interior Gateway Protocol (IGP) node router identifier.

4. The method of claim 2 wherein the demand marker is associated with a tuple defining a network flow.

5. The method of claim 2 further comprising inserting the demand marker into the forwarding information base update along with a related route.

6. The method of claim 1 wherein logging the packet into said demand comprises utilizing a network traffic flow collection process.

7. The method of claim 1 wherein said demands stored at the second network device are stored for a second time period, and wherein one of said time periods is a multiple of the other of said time periods.

8. The method of claim 1 further comprising receiving said demands from the second network device and demands from other network devices located at an edge of the network, and generating the demand matrix.

9. The method of claim 1 further comprising transmitting said demands stored in the demand database to a centralized server upon receiving a request for said demands.

10. The method of claim 1 further comprising transmitting said demands in the demand database from the first network device to the second network device in a Border Gateway Protocol (BGP) advertisement.

11. An apparatus comprising:
    a processor for logging a received packet into a demand corresponding to a cell of a demand matrix at a router, storing said demand in a demand database comprising a plurality of demands computed for a specified time period and corresponding to cells of said demand matrix, each of said cells identifying traffic entering a network at the apparatus and leaving the network at another router, processing demands received from other routers in the network and corresponding to cells of said demand matrix associated with traffic entering the network at the other routers and computed and stored at the other routers, and generating the demand matrix at the first router; and
    memory for storing the demand database.

12. The apparatus of claim 11 wherein logging the packet into said demand comprises inserting a demand marker in a forwarding information base.

13. The apparatus of claim 11 wherein the processor is further operable to process demands received from the network device and other network devices located at an edge of the network, and generate the demand matrix.

14. The apparatus of claim 11 wherein the processor is configured to update the demand database at a first frequency and transmit said demands at a lower frequency.

15. The apparatus of claim 11 wherein said demands stored at the network device are stored for a second time period, and wherein one of said time periods is a multiple of the other of said time periods.

16. Logic encoded on one or more non-transitory computer readable media for execution and when executed operable to:
log a packet received at a router into a demand corresponding to a cell of a demand matrix;
store said demand in a demand database comprising a plurality of demands corresponding to cells of said demand matrix, each of said cells identifying traffic entering a network at the router and leaving the network at another router;
receive from other routers in the network, demands corresponding to cells of said demand matrix associated with traffic entering the network at the other routers and computed and stored at the other routers; and
generate said demand matrix.

17. The logic of claim 16 wherein said demands computed and stored at each of the network devices are associated with a time period, and wherein said time periods have a common multiple.

18. The logic of claim 16 wherein said demands from said other network devices are received in Border Gateway Protocol (BGP) advertisements.

19. The logic of claim 16 wherein logging the packet into said demand comprises inserting a demand marker in a forwarding information base.

20. The logic of claim 19 further comprising logic operable to insert the demand marker into the forwarding information base update along with a related route.

* * * * *